United States Patent [19]

Bierlein et al.

[11] Patent Number: 4,553,856

[45] Date of Patent: Nov. 19, 1985

[54] BEARING HAVING NICKEL-TIN-COPPER BARRIER LAYER

[75] Inventors: John C. Bierlein, Washington; Arnold O. DeHart, Rochester, both of Mich.

[73] Assignee: General Motors Corporation, Detroit, Mich.

[21] Appl. No.: 470,445

[22] Filed: Feb. 28, 1983

[51] Int. Cl.$^4$ ............................ F16C 33/28; F16C 9/02
[52] U.S. Cl. ..................................... 384/276; 384/294
[58] Field of Search ............... 384/276, 288, 294, 280, 384/429; 308/DIG. 8

[56] References Cited

U.S. PATENT DOCUMENTS

| | | | |
|---|---|---|---|
| 1,770,582 | 7/1930 | Pike | 384/276 |
| 2,289,572 | 7/1942 | Underwood | 384/276 |
| 3,055,717 | 9/1962 | Schmidt | 384/294 X |
| 3,623,205 | 11/1971 | Scott | 384/276 X |

FOREIGN PATENT DOCUMENTS

| | | | |
|---|---|---|---|
| 624401 | 6/1949 | United Kingdom | 384/276 |
| 702188 | 1/1954 | United Kingdom | 384/276 |
| 711438 | 6/1954 | United Kingdom | 384/276 |

Primary Examiner—Stuart S. Levy
Assistant Examiner—Thomas R. Hannon
Attorney, Agent, or Firm—Elizabeth F. Harasek

[57] ABSTRACT

The heavy-duty performance of babbitt-lined, copper-lead based journal bearings is improved by a novel trimetallic barrier layer interposed between the babbitt and copper-lead layers. The trimetallic barrier layer contains the elements nickel, tin and copper in suitable proportions. In a preferred embodiment, the barrier layer consists of layers of nickel, tin and copper metals successively plated over the copper-lead base.

2 Claims, 3 Drawing Figures

BEARING HAVING NICKEL-TIN-COPPER BARRIER LAYER

This invention relates to improved journal bearings for use in heavy duty applications. More particularly, this invention relates to the incorporation of a nickel-tin-copper trilaminate barrier layer between the babbitt and copper-lead layers of a conventional, heavy-duty, journal bearing.

BACKGROUND

Increasing the output and efficiency of a heavy-duty diesel engine also increases the load on the journal bearings in which the crankshaft runs. Where such an engine is to be run for many thousand hours at temperatures above 120° C., crankshaft bearing failure may be precipitated by a slow change in the alloy compositions which comprise the various layers of the bearings.

One type of heavy-duty journal bearing that has provided good service for many years consists of a steel backing, a copper-lead alloy matrix adjacent the backing and a working surface of lead-tin babbitt. A very thin layer of nickel is interposed between the babbitt and copper-lead layers to prevent migration of metals therebetween. Such migration may create intermetallic compounds that do not have acceptable properties for use in a bearing when it is subjected to high temperatures and heavy loads. Bearing failure from scoring or sieze may result. Accordingly, it is an object of this invention to provide an improved, migration inhibiting, barrier layer between the babbitt and copper-lead alloy layers of a conventional heavy-duty journal bearing.

BRIEF SUMMARY

In accordance with a preferred practice of the invention, a heavy-duty journal bearing is made having the following configuration: a tough backing layer of steel or other suitable material; a layer of copper-lead alloy adjacent the backing which alloy comprises a continuous spongelike matrix of copper metal in which the voids are filled with lead; then, a thin layer of nickel metal; a thin layer of tin metal; a thin layer of copper metal; and a top layer of babbitt, a combination of about 90 percent lead and ten percent tin. The thin nickel, tin and copper layers together form a trilaminate interlayer that prevents the undesirable migration of tin from the babbitt layer. The interlayer also precludes the formation of alloys detrimental to bearing performance during prolonged operation at elevated temperatures over 120° C. and under heavy loads. That is, any diffusion coupling that naturally occurs between the metals of the several different bearing layers does not create an intermetallic compound that promotes bearing failure by scoring distress or sieze.

In a preferred practice, the bearing is made up of a mated pair of semicircular half bearings which together form a complete journal for a rotating shaft. The bearing halves are preferably made by successively plating the several layers over the backing. A conventional lubricant is preferably employed between the working surface of the bearing (i.e., the babbitt layer) and the shaft.

DETAILED DESCRIPTION

The invention will be better understood in view of the following Figures and Description in which.

Figure 1:
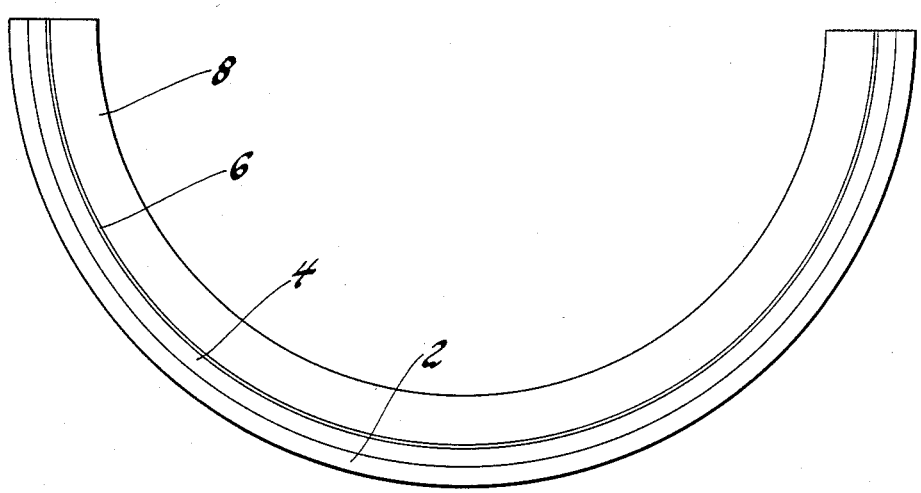
FIG. 1 is a sectional view of a conventional bearing half for the crankshaft of a heavy-duty diesel engine.

The subject invention is a novel improvement of conventional journal bearings of the type depicted in FIG. 1 and described in Table I below. The backing layer 2 is steel. A copper-lead alloy matrix 4 is applied over backing 2 by sintering copper and lead powders or applying a layer of molten alloy and cooling it. The matrix can be described as a major spongelike phase of copper metal in which the microscopic pores of the sponge are filled with lead metal. A layer of relatively pure nickel metal 6 is electroplated over the copper-lead layer 4. A layer of babbitt 8 is applied over the nickel layer 6 by electroplating from a conventional bath of lead and tin fluoroborates. Nickel layer 6 prevents the migration of tin into copper-lead layer 4 under normal bearing operating conditions.

TABLE I

Composition of Bearing

Babbitt
SAE 19 Material Specification
| Composition: | 84.5–92% | lead |
|---|---|---|
| | 8–12% | tin |
| | 3.5% | total others |
| Thickness: | 0.025 mm (0.001 in.) overplate | |

Nickel Barrier Layer
| Composition: | Pure electroplated nickel |
|---|---|
| Thickness: | 0.00127–0.00254 mm (0.000050–0.000100 in.) |

Copper-Lead
SAE 49 Material Specification
| Composition: | 73–79% | copper |
|---|---|---|
| | 21–27% | lead |
| | 0.5% | tin |
| | 0.35% | iron |
| | 0.45% | total others |
| Thickness: | 0.635 mm (0.025 in.) heavy wall | |

The total bearing thickness, including the steel back, is about 4.0 mm (0.157 in).

Figure 2:
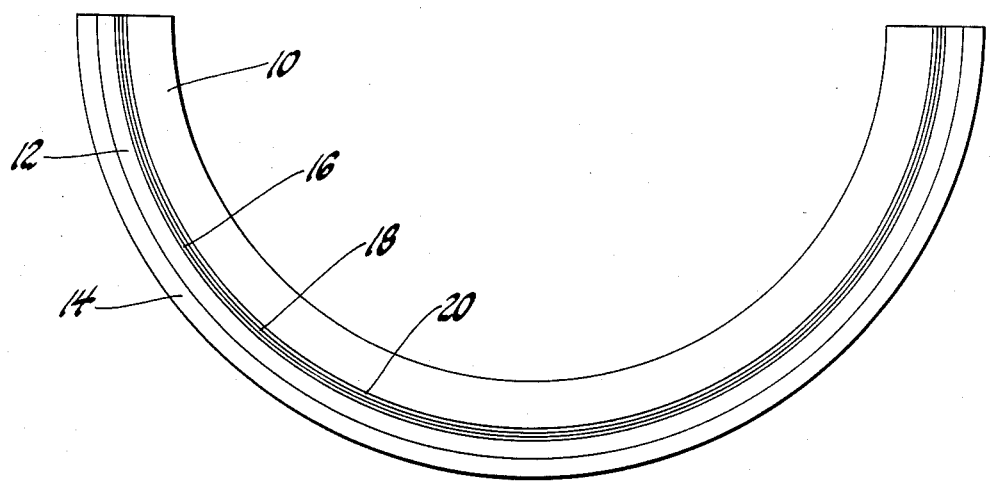
FIG. 2 is a sectional view of a bearing half for heavy-duty applications in accordance with the invention.

The subject invention relates to a new bearing shown at FIG. 2 which is better able to stand up to thousands of hours of use at temperatures over 120° C. at high loads. It is more durable than the prior art bearing of FIG. 1 under such abusive heavy-duty conditions. The babbitt layer 10, copper-lead layer 12 and steel backing layer 14 are the same as those of FIG. 1 and Table I. However, the nickel interlayer 6 of FIG. 1 is replaced by a trilaminate interlayer. This trilaminate barrier layer consists of a pure nickel layer 16 plated onto copper-lead layer 12 by conventional means. Then, a layer of tin metal 18 is electroplated over layer 16 in a conventional electroplating bath described in Table II.

TABLE II

| Electro Cleaner | |
|---|---|
| | 60 g/L McGean 154 MP at 65° |
| Copper Bath | |
| Copper cyanide | 52.5 g/L |
| Potassium cyanide | 102 g/L |
| Free potassium cyanide | 26 g/L |
| Potassium sodium Tartrate | 17.5 g/L |
| Temperature | 55° C. |
| Tin Bath | |

TABLE II-continued

| | |
|---|---|
| Potassium stannate | 189 g/L |
| Potassium hydroxide | 35 g/L |
| Temperature | 65° C. |
| Lead-Tin Bath | |
| Lead (as lead fluoborate) | 100 g/L |
| Tin (as stannous fluoborate) | 26 g/L |
| Peptone | 2 g/L |
| Temperature | Ambient |
| Acid Dip | |
| Temperature | 120 g/L Udylite oxyvate #345 Ambient |

A copper layer 20 is electroplated over tin layer 18 in the copper bath of Table II. The babbitt layer is applied over layer 18 in the lead-tin bath of Table II. Thus, the trilaminate barrier layer consists of a nickel layer adjacent the copper-lead layer; a tin layer over the nickel layer, and a copper layer over the tin. This nickel-tin-copper trilaminate barrier layer effectively prevents the migration of tin from the babbitt overlayer and has proven effective in avoiding the formation of alloys unsuitable for bearing use as will be described hereafter.

Under heavy-duty applications, there is an apparent tendency for the metals of the initially distinct trilaminate barrier layer to alloy with one another. We have discovered that in order to avoid the formation of unacceptable alloys of the metal constituents of the various bearing layers, the relative proportions of metals in the trilaminate layer should be controlled. This may be accomplished by regulating the relative thicknesses of the nickel, tin and copper layers. Although this "alloying" phenomenon does not occur in heavy-duty diesel engines, for example, until after about 5,000 hours of operation at temperatures over about 120° C. at loads over 5000 psi, it is imperative that the intermetallic alloys created by such in situ alloying do not cause bearing failure. In particular, the alloys must not score if they are contacted by the rotating shaft and they must not deteriorate to the point where the bearing siezes to the shaft. Under sieze conditions, the bearing layer most adjacent the shaft welds to it. After this occurs, the bearing layers may be ripped apart at the weakest bond between layers causing catastrophic failure of the bearing.

We have determined what we believe to be optimum thicknesses for the nickel, tin and copper layers used in a six inch diameter diesel journal bearing having steel backing, copper-lead matrix, and babbitt layers of the compositions and thicknesses set out for the conventional bearing in Table I. These preferred thicknesses and the ratios of thicknesses are set out in Tables III and IV, below.

TABLE III

Thickness of the Tri-Metal Layers
nickel 0.00127–0.00254 mm (0.000050–0.000100 in.)
tin 0.00064–0.00254 mm (0.000025–0.000100 in.)
copper 0.00064–0.00380 mm (0.000025–0.000150 in.)

Thus our new bearings feature a working surface of babbitt, an underlayer of bimetallic copper-lead and a steel backing layer with an improved barrier laminate layer between the babbitt and the copper-lead layers. The laminate barrier layer comprises a copper layer adjacent the babbitt layer, a nickel layer adjacent the copper-lead alloy layer and a layer of tin therebetween. The preferred thickness of the copper layer is about 25 to 150 microinches ($1 \times 10^{-6}$ in); the tin layer about 25 to 50 microinches; and the nickel layer about 50 to 100 microinches. The copper layer should be at least as thick as the tin layer.

TABLE IV

Thickness Bounds of Tri-Metal Barrier
1. Ni≦2.54 μm (100μ")—commercial limit
2. Ni≧1.27 μm (50μ")—commercial limit
3. Sn≦Ni thickness
4. Sn≧¼ Ni thickness
5. Sn≧0.64 μm (25μ")
6. Cu≧Sn thickness
7. Cu≦3×Sn thickness
8. Cu≦1½×Ni thickness
9. Cu≦3.80 μm (150μ")
10. Cu≧0.64 μm (25μ")

Figure 3:
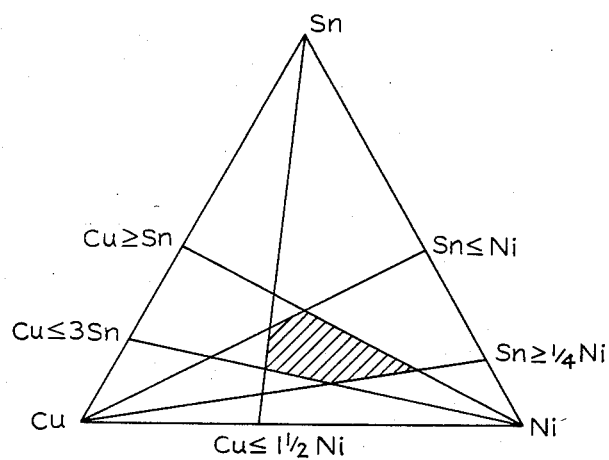
FIG. 3 is a ternary phase diagram for copper, tin and nickel where the subject bearing compositions, i.e., the acceptable ratios of the metals in the trilaminate barrier layer, are indicated by the shaded region.

FIG. 3 is a phase diagram that graphically illustrates the relative amounts of nickel, tin and copper that are suitable for this invention. The shaded area which lies inside the intersection of the compositional range limit lines avoid formation of intermetallic compositions of the elements nickel, tin and copper that have poor score resistance or unsuitable hardness.

EXAMPLE

The bearings used in this Example were standard 6 inch diameter diesel crankshaft journal bearings purchased from Gould, Inc., designation F-77. The bearings in cross section comprised (1) a topmost layer of babbitt—SAE 19; (2) a nickel barrier layer; (3) a copper lead matrix base layer—SAE 49; and (4) a steel backing layer. The thicknesses and compositions of the several layers are reported in Table I above. The copper-lead layer was applied to the steel backing by spreading a molten mixture of the elements onto a steel sheet and cooling the sheet from below. All other layers of the production bearing were applied by electroplating.

To form the subject trilaminate barrier layer bearings, Gould production bearings were reverse electroplated to selectively remove the top babbitt layer. The tin and copper layers were then sequentially electroplated over the remaining nickel base layer. The babbitt was reapplied to the working surface of the bearings by electroplating. All electroplating operations were conducted for times and at current densities appropriate to creating the desired layer thickness.

The bearings were tested in the following manner. Each bearing was retained in a journal around the crankshaft of a V-6, 92 cubic inch per cylinder, diesel engine with a power rating of 336 brake horsepower. The engine was run at a constant rate of 1200 revolutions per minute throughout the test. The bearing was lubricated with oil pumped from a 50 quart capacity open sump. Twenty-five quarts of new SAE 10W-40 oil were initially introduced into the sump.

During each test cycle, the engine was run continuously for five hours. It was then allowed to stand without running until it cooled to room temperature.

The first cycle was run with the original 25 quarts of clean oil in the sump. After the first cooling cycle, one half quart of a mixture of 50% ethylene glycol and 50% water was added to the oil in the sump. Obviously this diluted the oil with a less effective liquid so far as lubrication is concerned. The engine was then subjected to another five hour run and allowed to cool to room temperature.

On the second and each successive cycle, an additional half quart of glycol and water were added to the sump. That is ½ quart was added for the first cycle, 1 quart for the second cycle, 1.5 quarts for the third cycle, 2 quarts for the fourth cycle, etc. As the sump itself was not closed, the water tended to evaporate during each 5 hour running cycle and the glycol appeared to chemically degrade.

Test failure was that point at which friction between the bearing and the crankshaft created a bearing temperature about 23.5° C. above the normal bearing operating temperature of 110° C. Table V reports the test results for the following bearings: (1) a new Gould F-77 production bearing, (2) a heat aged Gould F-77 production bearing, (3) a new trilaminate plated bearing in accordance with the invention and (4) a heat aged trilaminate bearing in accordance with the invention. The "Average Lubrication Dilution at Failure" is reported as the sum of all the quarts of glycol and water added to the original 25 quarts of oil in the sump at the time the bearing temperature rose to about 133° C.

Aging the new bearings at 220° C. for 400 hours produces about the same amount of diffusion of the constituent metals of the several bearing layers as does 5000 or more hours of wear at a load of about 6000 psi at a temperature of about 120° C. Thus the heat treatment is a means of accelerating the testing of bearing life cycle.

TABLE V

SCORE RESISTANCE TEST
Glycol & Water in Oil Lube
6" Diesel Crank Shaft Bearing

| | Bearing | | Thickness ($1 \times 10^{-6}$ inches) | Average Lube Dilution to Failure |
|---|---|---|---|---|
| 1. | 75 Cu 25 Pb | (NEW) | 2500 | (sum of Quarts 50:50 Glycol: H₂O added) |
| | Ni | | 50 | |
| | 90 Pb 10 Sn | | 1000 | 227 |
| 2. | 75 Cu 25 Pb | (AGED)* | 2500 | |
| | Ni | | 50 | 156 |
| | 90 Pb 10 Sn | | 1000 | |
| 3. | 75 Cu 25 Pb | (NEW) | 2500 | |
| | Cu | | 50 | 264 |
| | Sn | | 50 | |
| | Ni | | 50 | |
| | 90 Pb 10 Sn | | 1000 | |
| 4. | 75 Cu 25 Pb | (AGED)* | 2500 | |
| | Cu | | 50 | |
| | Sn | | 50 | 248 |
| | Ni | | 50 | |
| | 90 Pb 10 Sn | | 1000 | |

*Aged Bearings heated at 220° C. for 400 hours. Heat aging simulates wear of more than 5000 hours in a heavy-duty diesel engine at an approximate load of 6000 PSI.

Referring to Table V, it is clear that use of the trilaminate barrier layer in the subject bearings improves bearing life under heavy-duty applications. The new trilaminate barrier bearing clearly surpasses the heat aged nickel-only barrier bearing. Very significant, however, is the fact that the life of the heat aged and the new trilaminate barrier bearings are about the same. That is, the subject novel bearings do not degrade under use in heavy-duty applications. Stated in another way, the trilaminate barrier bearing starts out with good score and sieze resistance and maintains these characteristics as the constituent metal layers gradually diffuse with one another. In the field, this diffusion is precipitated by wear while in the accelerated test the diffusion is precipitated by a heating cycle.

Manufacture of the subject bearings has been described in terms of electroplating the barrier and babbitt layers. However, like results can be obtained using any other suitable metal application technique such as flame spraying, rapid D.C. sputtering, sintering, electroless plating, etc.

In summary, we have discovered that interposing a thin trilaminate layer of nickel, tin and copper between the babbitt and copper-lead layers of a conventional heavy-duty bearing increases its life and improves its performance when subjected to rugged operating parameters. The order of the layers in the bearing is chosen to optimize the migration characteristics of the constituent metals, particularly to prevent excessive loss of tin from the babbitt overlayer. We believe the heat diffusion results indicate that application of a single interlayer of suitable alloy of copper, nickel and tin (i.e., those having a composition in the shaded region of FIG. 3) would produce the same result as using three separate layers.

While our invention has been described in terms of specific embodiments thereof, other forms may be readily adapted by one skilled in the art. Accordingly, the scope of the invention is limited only by the following claims.

The embodiments of the invention in which an exclusive property or privilege is claimed are defined as follows:

1. A journal bearing having a working surface of lead-tin alloy, a durable metal backing and a plurality of layers therebetween, said layers comprising in sequential order from the working surface inwardly towards the backing; a copper layer; a tin layer; a nickel layer and a copper-lead alloy layer, wherein said copper layer is at least as thick as said tin layer and wherein the thickness of the copper layer is about 25 to 150 microinches; the thickness of the tin layer is about 25 to 50 microinches; and the thickness of the nickel layer is about 50 to 100 microinches.

2. A heavy-duty journal bearing comprising a working surface of babbitt which consists essentially of about 15 weight percent tin and the balance lead, an underlayer consisting essentially of about 25 weight percent lead and the balance copper and a backing layer of steel; wherein said bearing an electroplated trilaminate barrier layer is interposed between said babbitt and copper-lead layers which barrier layer comprises a first layer of copper about 25 to 150 microinches thick; a second layer of tin about 25 to 50 microinches thick, and a third layer of nickel about 50 to 100 microinches thick.

* * * * *